United States Patent
Esam et al.

(10) Patent No.: US 11,956,488 B2
(45) Date of Patent: Apr. 9, 2024

(54) PROVIDING CONTROLLED ACCESS TO CONTENT ON A CLIENT SYSTEM

(71) Applicant: International Business Machines Corporation, Armonk, NY (US)

(72) Inventors: Alexander Esam, Nottingham (GB); Benjamin Wileman, Towcester (GB); Gavan Mullan, Belfast (GB); Jennifer Kristine Foley Francis, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 17/656,259

(22) Filed: Mar. 24, 2022

(65) Prior Publication Data

US 2023/0308697 A1  Sep. 28, 2023

(51) Int. Cl.
*H04N 21/254* (2011.01)
*H04L 9/32* (2006.01)
*H04N 21/2347* (2011.01)
*H04N 21/258* (2011.01)
*H04N 21/835* (2011.01)

(52) U.S. Cl.
CPC ....... *H04N 21/2541* (2013.01); *H04L 9/3213* (2013.01); *H04N 21/2347* (2013.01); *H04N 21/25816* (2013.01); *H04N 21/835* (2013.01); *H04L 2209/60* (2013.01)

(58) Field of Classification Search
CPC ........... H04N 21/2541; H04N 21/2347; H04N 21/25816; H04N 21/835; H04L 9/3213; H04L 2209/60
See application file for complete search history.

(56) References Cited

U.S. PATENT DOCUMENTS

| | | | |
|---|---|---|---|
| 2009/0070676 A1* | 3/2009 | Kirkland | H04M 3/42221 715/716 |
| 2016/0063578 A1 | 3/2016 | Carasso | |
| 2017/0339254 A1 | 11/2017 | Garg | |
| 2019/0090021 A1* | 3/2019 | Walker | H04N 21/252 |
| 2021/0250335 A1 | 8/2021 | Lyndon-James | |
| 2022/0035936 A1* | 2/2022 | Lin | H04L 9/0825 |
| 2023/0188358 A1* | 6/2023 | Wang | H04L 9/3247 713/176 |

FOREIGN PATENT DOCUMENTS

WO    2021064832 A1    4/2021

OTHER PUBLICATIONS

"Allowing acceptable ads in Adblock Plus—Agreements", ABP AdblockPlus, Copyright © 2020, 2 pages, <https://adblockplus.org/acceptable-ads-agreements>.

(Continued)

*Primary Examiner* — Mohammad W Reza
(74) *Attorney, Agent, or Firm* — David B. Woycechowsky

(57) ABSTRACT

Providing controlled access to content on a client system by providing protected content on a client system where the content is accessible with a token and providing a media file at the client system with the token embedded in association with the media file. The protected content is accessed by releasing the token to the client system when it is determined that an action condition of the media file has been met and using the token to enable access to the protected content on the client system.

6 Claims, 12 Drawing Sheets

(56) References Cited

OTHER PUBLICATIONS

McCue, TJ, "47 Percent of Consumers Are Blocking Ads", Mar. 19, 2019, 3 pages, <https://www.forbes.com/sites/tjmccue/2019/03/19/47-percent-of-consumers-are-blocking-ads/?sh=11353d1b2037>.
Mell et al., "The NIST Definition of Cloud Computing", NIST National Institute of Standards and Technology U.S. Department of Commerce, Special Publication 800-145, Sep. 2011, 7 pages.
Tasci, Mesut, "Read medium for free—Chrome Web Store", Sep. 8, 2021, 5 pages, <https://chrome.google.com/webstore/detail/read-medium-for-free/feckflmdfioohghkgojnilnlaelfgffl?hl=en>.

\* cited by examiner

PROVIDING CONTROLLED ACCESS TO CONTENT ON A CLIENT SYSTEM

BACKGROUND

The present invention relates to content access control, and more specifically, to providing controlled access to content on a client system.

Advertisement blocking or "ad-blocking" is a software capability for blocking or altering online advertising in a web browser or an application. Ad-blocking software operates on mobile and desktop computing devices and may be incorporated into web browsers or may be provided as an external application.

SUMMARY

According to an aspect of the present invention there is a computer-implemented method for providing controlled access to content on a client system, with the method being carried out by one or more processors of a client computer system and including the following operations (not necessarily in the following order): providing protected content on a client system, wherein the content is accessible with a token; providing a media file at the client system with the token embedded in association with the media file; determining that an action condition of the media file has been met; receiving the token released to the client system when the action condition of the media file has been met; and using the token to enable access to the content on the client system.

According to another aspect of the present invention there is a computer-implemented method for providing controlled access to content on a client system, with the method being carried out by one or more processors of a server system and including the following operations (not necessarily in the following order): protecting content, wherein the content is accessible with a token; serving the protected content to a client system; embedding the token in association with a media file; providing the media file to the client system; and releasing the token when triggered due to an action condition of the media file being met at the client system thereby enabling the protected content to be accessed by using the token.

According to another aspect of the present invention there is a computer system for providing controlled access to content on a client system, with the computer system including: a client system including a processor and a memory configured to provide computer program instructions to the processor to execute the function of the following components: a protected content component for providing protected content on the client system, wherein the content is accessible with a token; a media file component for providing a media file at the client system with the token embedded in association with the media file; an action determining component for determining that an action condition of the media file has been met; a token receiving component for receiving the token released to the client system when an action condition of the media file has been met; and an accessing component for using the token to enable access to the protected content on the client system.

According to another aspect of the present invention there is a computer system for providing controlled access to content on a client system, with the computer system including: a server system including a processor and a memory configured to provide computer program instructions to the processor to execute the function of the following components: a protecting component for protecting content, wherein the content is accessible with a token; a protected content serving component for serving the protected content to a client system; an embedding component for embedding the token in association with the media file; and a media file providing component for providing the media file to the client system; a token releasing component for releasing the token when triggered due to an action condition of the media file being met at the client system thereby enabling the protected content to be accessed by using the token.

According to another aspect of the present invention there is a computer program product for providing controlled access to content on a client system, the computer program product including a computer readable storage medium having program instructions embodied therewith, the program instructions executable by a processor to cause the processor to perform the following operations (not necessarily in the following order): provide protected content on a client system, wherein the content is accessible with a token; provide a media file at the client system with the token embedded in association with the media file; determine that an action condition of the media file has been met; receive the token released to the client system when the action condition of the media file has been met; and use the token to enable access to the content on the client system.

According to another aspect of the present invention there is a computer program product for providing controlled access to content on a client system, the computer program product including a computer readable storage medium having program instructions embodied therewith, the program instructions executable by a processor to cause the processor to perform the following operations (not necessarily in the following order): protect content, wherein the content is accessible with a token; serve the protected content to a client system; embed the token in association with a media file; provide the media file to the client system; and release the token when triggered due to an action condition of the media file being met at the client system thereby enabling the protected content to be accessed by using the token.

In some embodiments of the present invention, the computer readable storage medium is a non-transitory computer readable storage medium and the computer readable program code (that includes both the program instructions and data) is executable by a processing circuit and/or a set of processor(s).

DETAILED DESCRIPTION

Embodiments of a method, system, and computer program product are disclosed for providing media content on a client system. The described method provides an assurance that a media file is viewed before protected content can be accessed on a client system. In some embodiments, the protected content can be content on a client website or a client application. The protected content may be selected portions of content on a client website or in a client application.

The described method can be used in various situations. In one embodiment, the media file may contain essential information that is required to be viewed before the protected content is accessed. For example, the media file may be a warning regarding viewing of the protected content, such as due to age-appropriateness. In another example, the media file may by a government announcement or health warning. In yet another embodiment, the media file may be an advertisement or notification that is required to be viewed before accessing the protected content.

The controlled access to content on a client system is an improvement in the technical field of computer content delivery generally and more particularly in the technical field of encryption of content.

The widespread use of ad-blockers means that a large proportion of advertisements are not seen or watched by users. This results in a loss of revenue affecting the economic model of many website providers.

One solution allows "acceptable advertisements" on ad-blockers which are non-intrusive advertisements such as on the side of a news article. Users using ad-blockers sign up to the system to allow such advertisements. This system is not widely used and so the majority of advertisements are still not shown to users.

A solution used, for example, by some news websites, forces users to sign up or subscribe to the website to allow them to read an article. This proposition however can be too much inconvenience for users who might only use the website once and do not want to register.

Another solution used by news websites only allows five free pages to the user before they have to register. They may also have a "premium article" page which acts like a subscription service. To get around this issue, browser extensions, such as "read medium for free", have been created which negate these efforts by companies to ensure their revenue stream stays intact.

Figure 1:
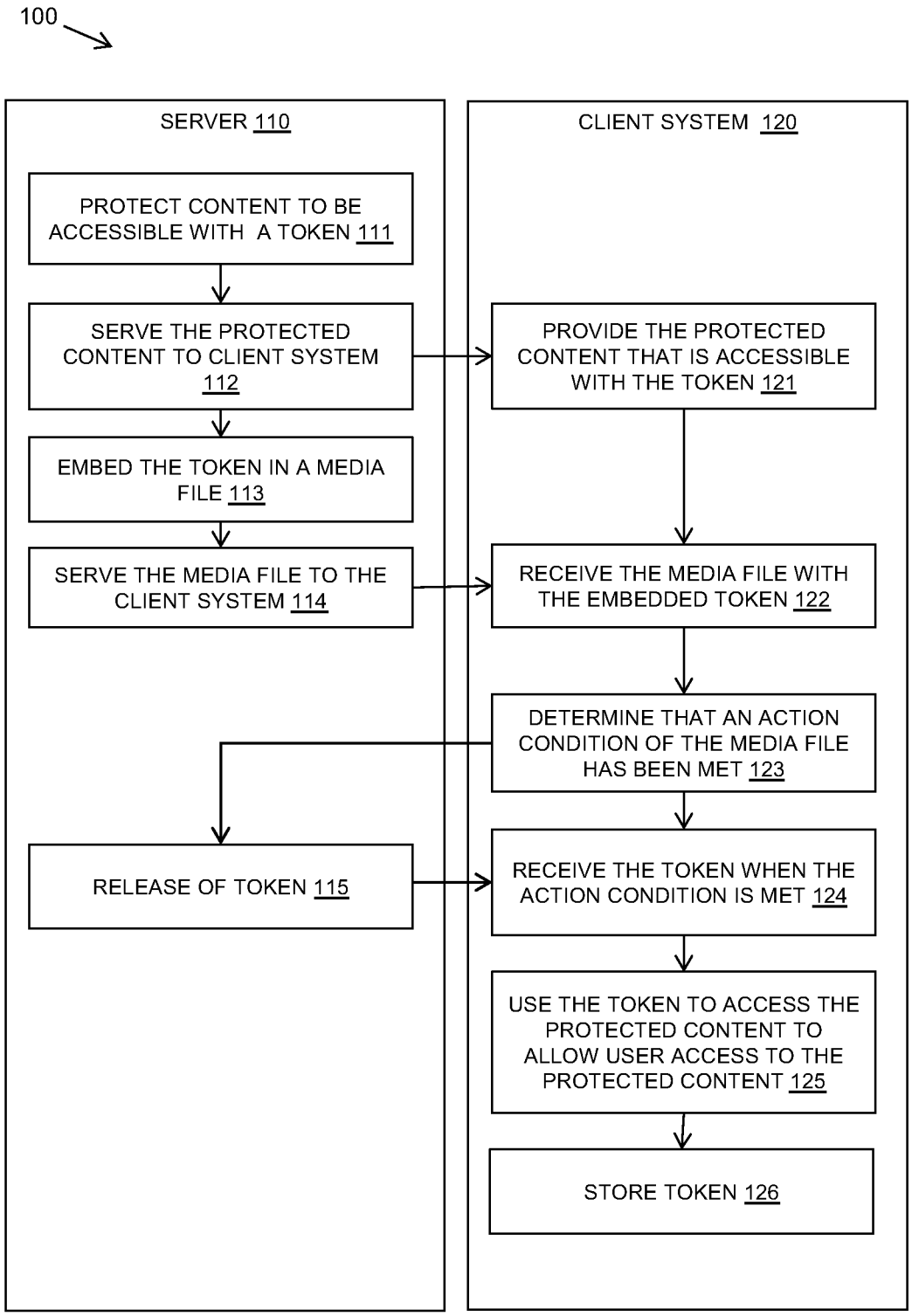
FIG. 1 is a swim-lane flow diagram of an example embodiment of a method in accordance with embodiments of the present invention.

Referring to FIG. 1, swim-lane flow diagram 100 shows an example embodiment of the described method for providing media content on a client system 120, with method steps carried out at a server 110 and at the client system 120. The server 110 may represent more than one server, for example, a protected content providing server (such as a website server) and a media file providing server (such as an advertisement server).

At the server 110, the method protects 111 content that is to be served to client systems, so that it is only accessible when accessed with a token. The server 110 serves 112 the protected content to a client system 120. The method may protect 111 the content by encrypting it with a cryptographic token or by otherwise blocking access to it unless an access token is available. At the client system 120, the method provides 121 the protected content to a user with the protected content only accessible with the token.

At the server 110, the method embeds 113 the required access token in or in associations with a media file and serves 114 the media file to the client system 120 as a media file linked to the protected content.

At the client system 120, the method receives 122 the media file with the embedded token. The method at the client system 120, determines 123 that an action condition in relation to the media file has been met to trigger the server 110 to release 115 the token to the client system 120. The action condition may be the viewing of the media file or a user action being received, such as a user input.

In one embodiment, the token may be embedded alongside a request for the media file and the token may be released by the server providing the media file after verifying that the action condition has been met in relation to the media file.

The client system 120 receives the released token 124 and may then use 125 the token to access the protected content on the client system 120. The client system 120 may store 126 the token for repeated use. The stored token may have a finite lifespan after which it may no longer be used. Alternatively, the token may be a single use token.

Figure 2A:
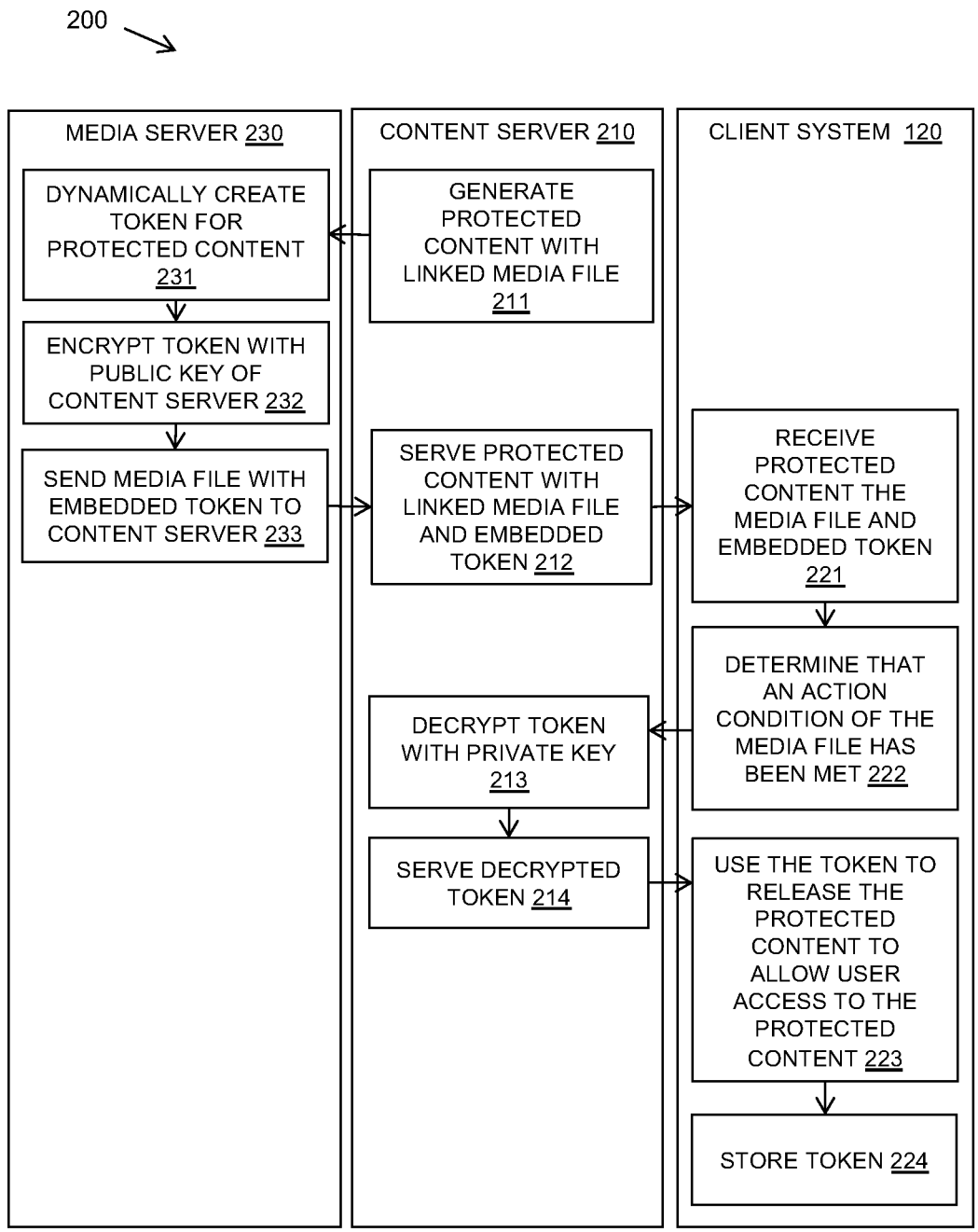
FIG. 2A is a swim-lane flow diagram of an example embodiment with two servers in accordance with embodiments of the present invention.

Referring to FIG. 2A, a swim-lane flow diagram 200 shows further details of an example embodiment of the method with a multi-server arrangement of a media server 230 for serving the media file and a content server 210 for serving the content to a client system 120.

The content server 210 may generate 211 protected content with a linked media file provided by a media server 230. The token request may be sent alongside a request to the media server 210 from the content server 210 when the media file is needed. The media server 230 may dynamically create 231 the corresponding access token for the protected content.

The content may be protected by the content server 210 by encrypting 232 it with a public key of the media server 230 and the media server 230 may create a corresponding private key which is the token. For example, this may be for each page served by the content server 210.

The media server 230 may in turn encrypt the token with the public key of the content server 210 (so that the content server 210 can decrypt the token when required). The media server 230 may send 233 the media file with the embedded encrypted token to the content server 210.

The content server 210 may serve 212 the protected content with the linked media file and embedded token to the client system 120. For example, with the token embedded in the Hypertext Markup Language (HTML) that is served to the client system 120.

The client system 120 may receive 221 the protected content with the linked media file and embedded token. The client system 120 may determine 222 that an action condition of the media file has been met that may trigger the decryption 213 of the token at the content server 210 using the private key of the content server 210. The content server 210 may server 214 the decrypted token to the client system 120 in place of the encrypted token. The decrypted token may then be used 223 to release the protected content allowing access to the protected content by the client system 120. The client system 120 may store 224 the decrypted token.

Figure 2B:
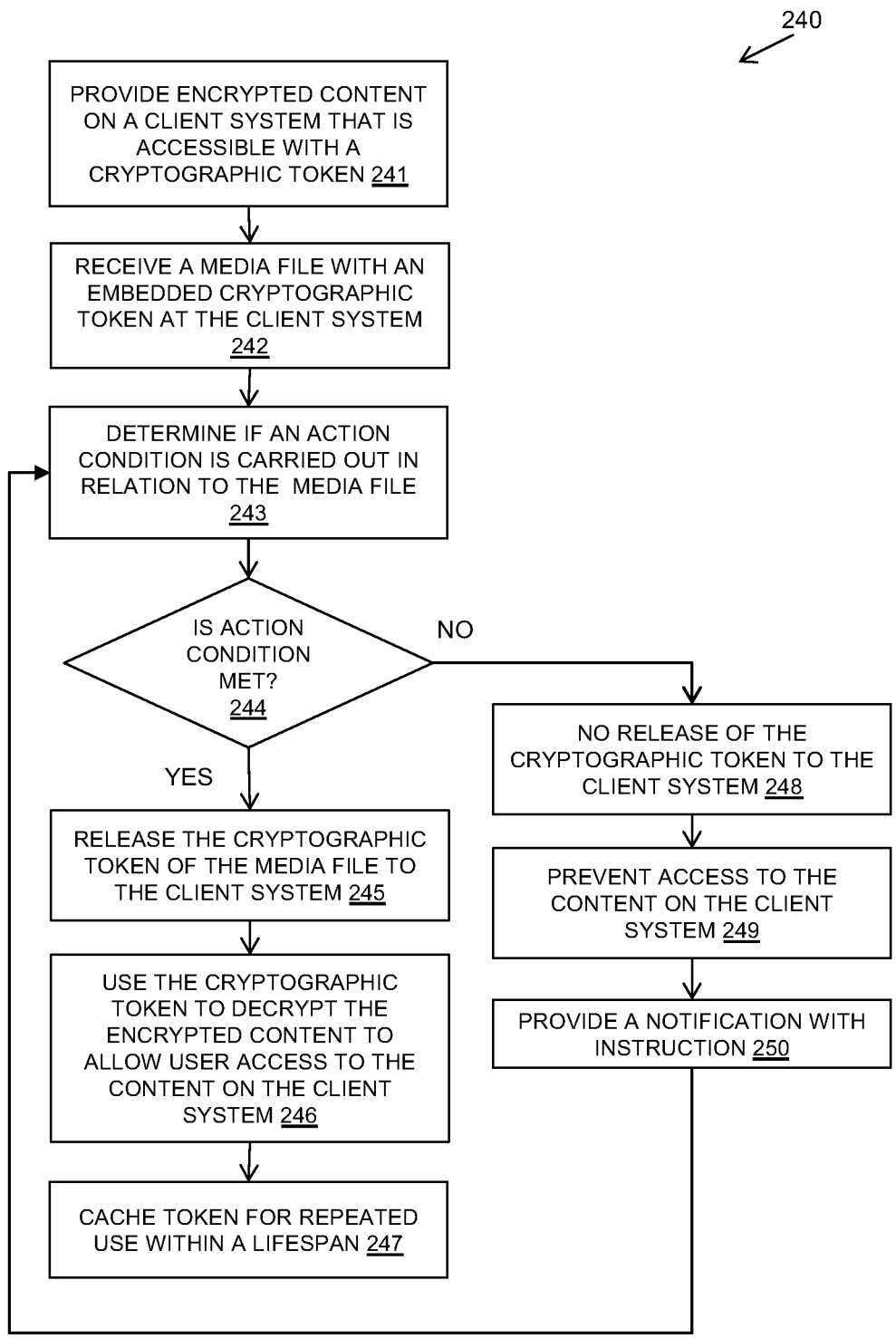
FIG. 2B is a flow diagram of an example embodiment at a client system in accordance with embodiments of the present invention.

Referring to FIG. 2B, flow diagram 240 shows further details of an example embodiment of the method at the client system 120. In this example, the protected content is encrypted access provided using a cryptographic token.

The method provides 241 encrypted content on at client system 120 that is accessible by decryption with a cryptographic token. The encrypted content may be provided at a client website or in a client application. For example, this may be an article, a video or other media content to which access is protected.

The cryptographic token may be a key that corresponds to a key used to encrypt the content at a server. For example, the cryptographic token may be a private key that corresponds to a public key used to encrypt the content. Another form of cryptographic token may be a utility token that allows a user to perform certain actions on the network, such as to confirm that the media file has been viewed.

The method receives 242 a media file with the cryptographic token embedded in it. The media file may be received 242 with the encrypted content from a server or linked to the encrypted content. The media file may be unskippable meaning that it is configured to be played fully before it can be closed. In example embodiments, the media file is a video file or a static image file.

It may be determined 243 if an action condition is carried out in relation to the media file at the client system. The method may determine 244 if an action condition has been met. The action condition may be a threshold duration of viewing of the media file or a received user action such as a user input. For example, in the case of a video file, the viewing condition may be the playing of the whole media file or a threshold duration of the media file. In the case of a static file, the viewing condition may display the static file for a threshold duration. In another example, the action condition may require the answering of a question the answer to which would only be available if the media file had been viewed.

If the action condition is met, this triggers an event to release 245 the cryptographic token at the client system. The cryptographic token is then used 246 to decrypt the encrypted content to allow the user to access the content on the client system.

The client system 120 may cache 247 the token for repeated use. The token may have a finite lifespan after which it may no longer be used. For example, for a news article, the token may be cached so that the user does not need to carry out the action again (for example, watching an advertisement) if they refresh the web page or click through to another hyperlink within the website. The cached token would automatically verify that the action condition has been met. In another example, on a video platform, the token may be stored with a lifetime such that the user will get another advertisement after a token's lifetime has expired.

If the action condition is not met 244, the cryptographic token is not released 248 from the media file and access to the encrypted content is prevented 249.

As an additional process, the method may provide a notification 250 to the user to rectify the situation by carrying out the action condition. For example, this may require the user to view or act on the media file to release the cryptographic token. The user may need to first take other actions to enable them to view or act on the media file such as the action to remove ad-blocker software.

The method results in a user having to view a media file, such as a warning or advertisement, for the content to be accessed. If the media file is blocked, so is the content the user is trying to view.

In one embodiment, the media file is an advertisement. The advertisement may be an acceptable advertisement, such as an advertisement that is provided alongside the content. The advertisement may alternatively be an advertisement that is impactful on the content being viewed. The advertisement may be a video advertisement or a static image advertisement. The described method may be used for efficiently loading media files in the form of advertisements on a website and allowing a user to view the advertisements by utilizing cryptographic tokens to prevent ad-blockers. A cryptographic token is sent with the advertisement and released once the advertisement has been viewed for a configured duration of time.

When an advertisement is sent from the advertisement server to the correlating website, a token is sent along with it. This token will act as a verification that the advert has been acknowledged and viewed by ensuring the token has successfully made its way to the website. If the token is not received successfully, the website itself will not function as expected with the content being encrypted, meaning the advertisement is needed to make the website run.

As another example embodiment, a video element in a webpage is provided that contains a simple cryptographic token in its data. This may use a custom video player, for example. There is an event to release the embedded token to the user that triggers upon a certain condition being met. The condition may be that the video finishes playing (the video also being unable to be skipped) or a specified amount of video has been played. The token can then be used to "unlock" whatever content it was linked to.

The protected content may be the whole content of a website or an application that is only made accessible once a media file has been viewed. Alternatively, the protected content may be a specific portion of content, such as an article, a page, or a video.

The described method may be used to remove the need for websites to rely on a subscription service, instead they can rely on advertisements. This in turn allows more people to view content on a website and widens the website's profile.

Advertisements on videos, for example, may contain a token or key that is released upon viewing the advertisement fully. The token then "unlocks" the video the user was trying to view. If the client is using an ad-blocking service, the video may show an error and the video will not play as its locked.

Current ad-block browser extensions prevent advertisements from being shown and therefore, with the described method, the webpage would not load for the user until the advertisement is allowed onto the user's browser. This is useful for companies to use as often web-based companies rely on advertisements to make a profit.

Even though ad-blockers are constantly evolving to circumvent advertisements, the use of a cryptographic key or token blocking the display of said content would be too processor heavy and time consuming for a web extension to break, with the alternative being allowing an advertisement to be displayed or played.

As the users have to view an advertisement, the number of viewers is high and the number of advertisements can be kept low. This compares to the alternative of increasing the number of advertisements to counter the high volume of ad-blocker users. This provides a solution whereby the user is not being inundated with advertisements, and companies do not need to pay for more advertisements.

The token may not need to be provided on every advertisement, it could be used on specific advertisements that a company could pay to have the token, or for information that is known to be factually correct. This can prevent misinformation if handled properly.

Important government announcements for topics or concerns such as a health crisis or related advertisements may be shown online and therefore reach more people than before. This would make the government spending more efficient and more people would be informed of the important news.

Various example embodiments of the application of the described method are described the schematic diagrams of FIGS. 3, 4A, 4B and 5.

Figure 3:
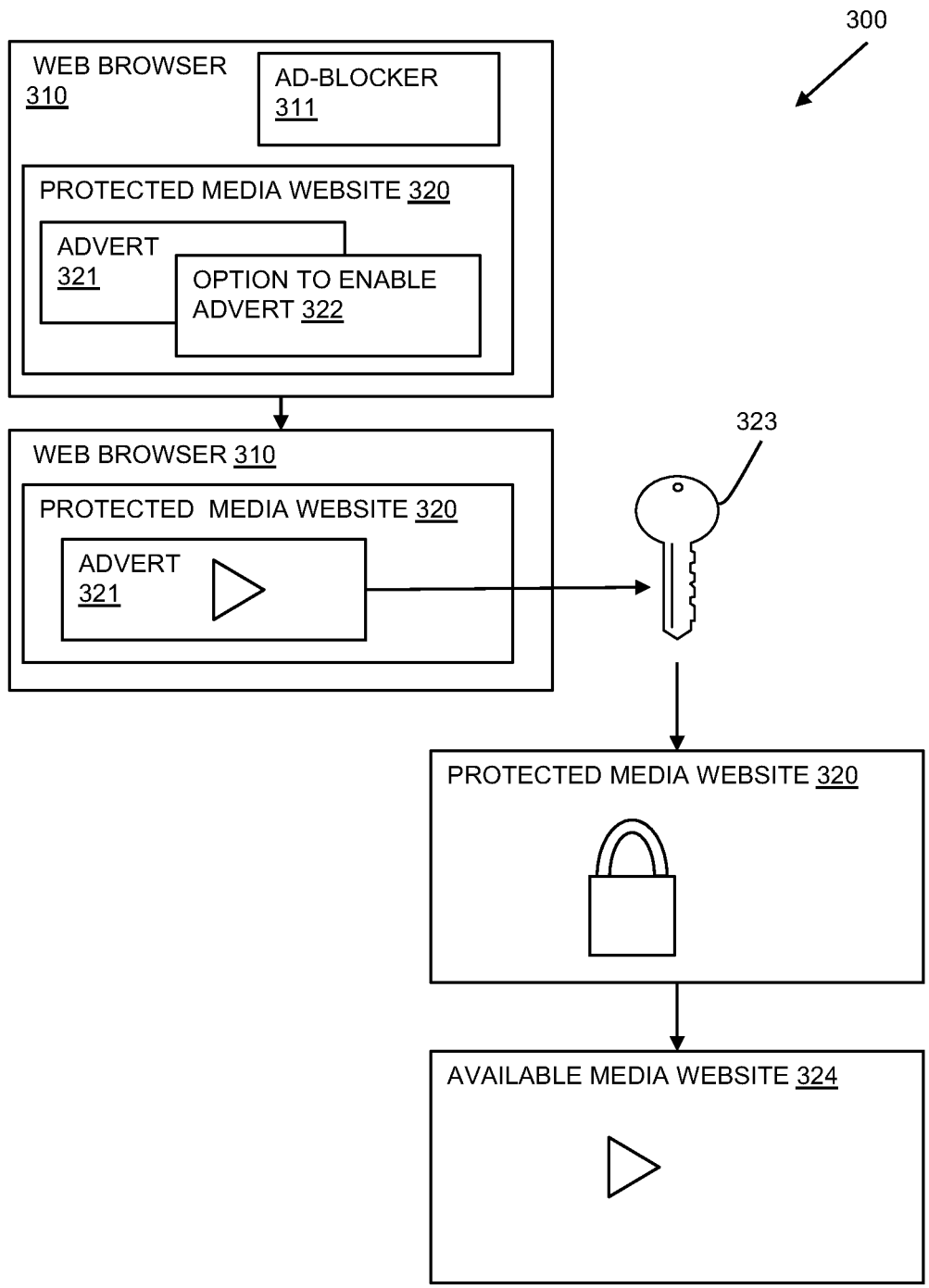
FIG. 3 is a schematic diagram of an example embodiment of an application of a method in accordance with embodiments of the present invention.

In FIG. 3, schematic diagram 300 shows a web browser 310 in which an ad-blocker 311 is active to block advertisements on websites provided on the web browser 310. Using the described method, a media website 320 is protected with an advertisement 321 that needs to be played to release a key 323 to provide access to the protected media website 320.

Due to the ad-blocker 311 provided on the web browser 310, the advertisement 321 cannot be played and the key 323 cannot therefore be released. An option 322 is provided to enable the advertisement by removing or disabling the ad-blocker 311. Once this has been done, the advertisement 321 can be played and the key 323 released. The key 323 is used to decrypt or unlock the protected media website 320 to provide an available media website 324 for viewing and interaction by the user.

Figure 4A:
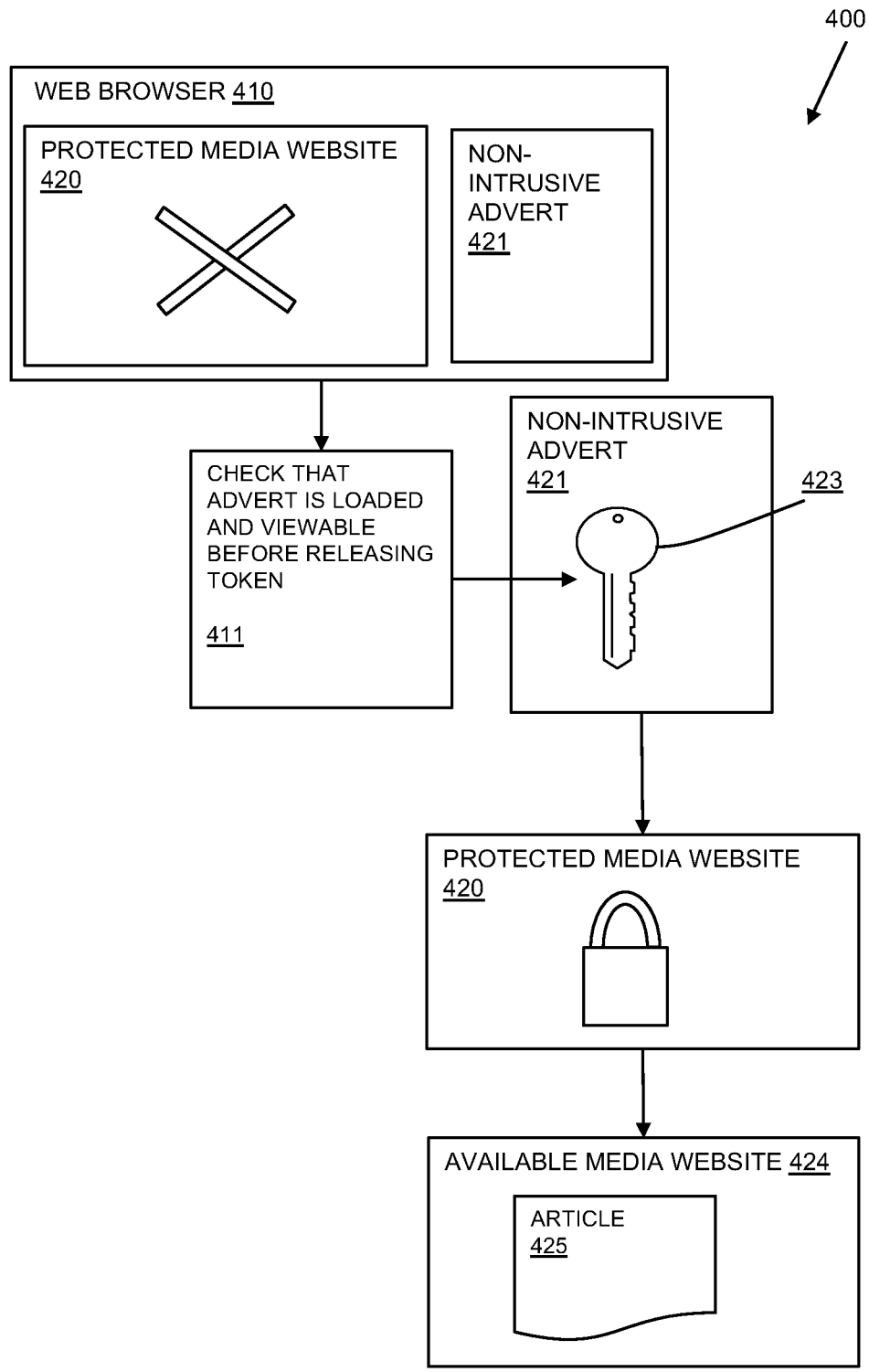
FIG. 4A is a schematic diagram of a second example embodiment of an application of a method in accordance with embodiments of the present invention.

In FIG. 4A, schematic diagram 400 shows a web browser 410 in which non-intrusive advertisements 421 are permitted to be displayed. Using the described method, a media website 420 is protected and a non-intrusive advertisement 421 is displayed adjacent the media website 420. The method checks 411 that the advertisement 421 is loaded and viewable before releasing the token 423 that is embedded in the advertisement 421. The token 423 is used to decrypt or unlock the protected media website 420 to provide an available media website 424, for example, allowing the user to read an article 425.

Figure 4B:
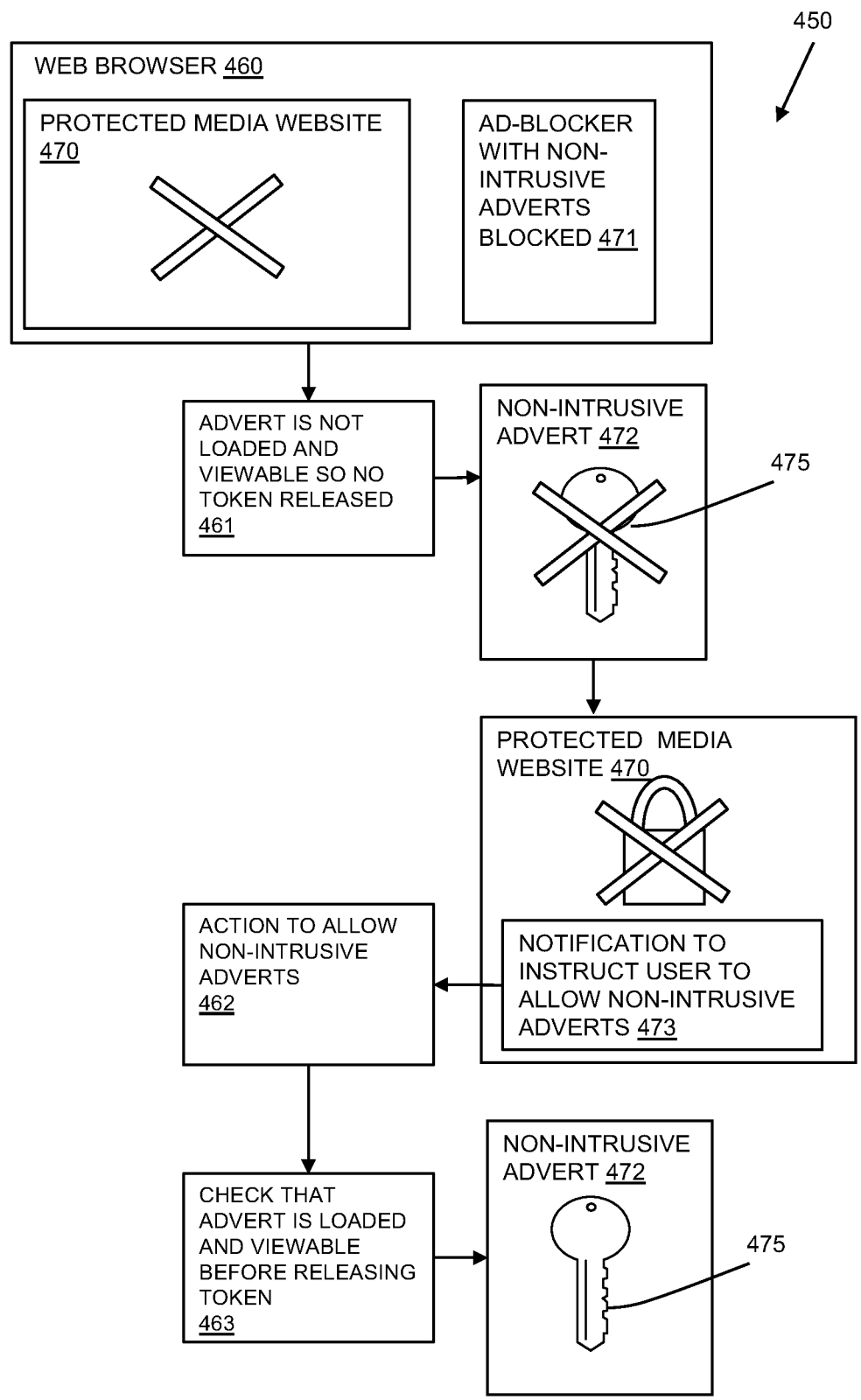
FIG. 4B is a schematic diagram of a second example embodiment of an application of a method in accordance with embodiments of the present invention.

In FIG. 4B, schematic diagram 450 shows a similar scenario to that of FIG. 4A, with a web browser 460 in which an ad-blocker 471 is provided to block non-intrusive advertisements. Using the described method, a media website 470 is protected. A non-intrusive advertisement 472 is not loaded and viewable so the token 475 is not released (461). The protected media website 470 is therefore not accessible and displays a notification 473 to instruct the user to allow non-intrusive advertisements.

A user action is received 462 to allow non-intrusive advertisements on the web browser 460 and the method checks 463 that the advertisement 472 is loaded and viewable before releasing the token 475 that is embedded in the advertisement 472. The token 475 is used to decrypt or unlock the protected media website 470.

Figure 5:
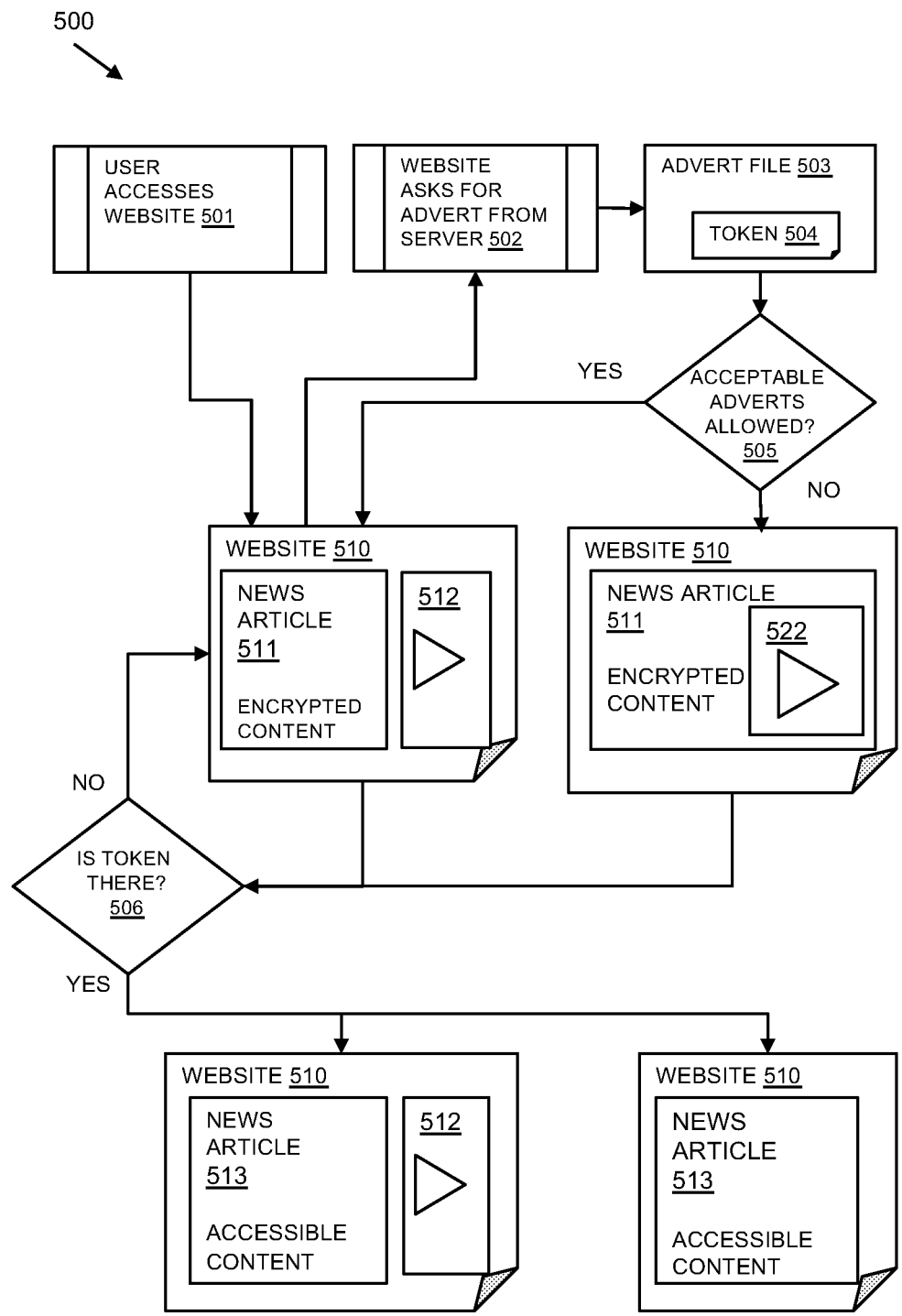
FIG. 5 is a schematic diagram of a third example embodiment of an application of a method in accordance with embodiments of the present invention.

In FIG. 5, a schematic diagram 500 shows another example scenario. A website 510 is provided with a news article 511. The website 510 is protected with the described method and the content of the news article 511 is encrypted.

A user accesses 501 the website 510 and the website asks 502 for an advertisement from the server and accesses an advertisement file 503 with an embedded token 504. It is determined 505 if the website 510 allows acceptable advertisements to show through their ad-blocker. If acceptable (for example, non-intrusive advertisements) are allowed the advertisement file 503 is displayed 512 as an acceptable advertisement on the website 510. If acceptable advertisements are not allowed, the advertisement file 503 is displayed as an advertisement 522 impacting the user experience.

It is determined 506 if a token is available. This will become available when the advertisements 512 or 522 are played or displayed for a given duration. If the tokens are not available, the news article 511 remains encrypted and inaccessible to the user. However, if the token is available, the news article 513 is decrypted and the content made available.

Figure 6A:
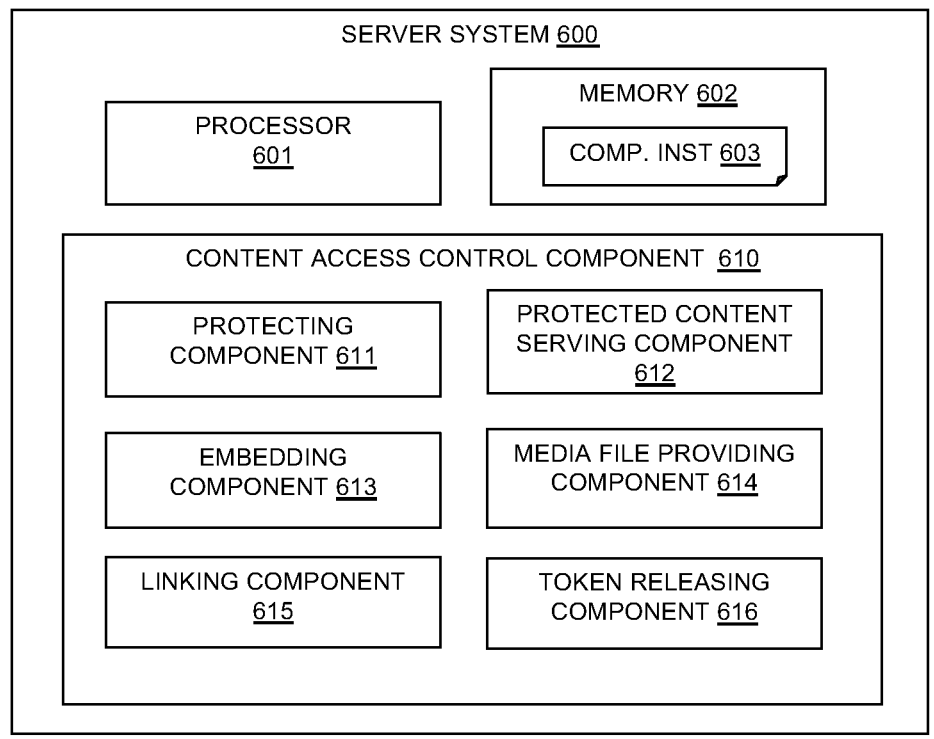
FIG. 6A is a block diagram of an example embodiment of a system in accordance with embodiments of the present invention.
Figure 6B:
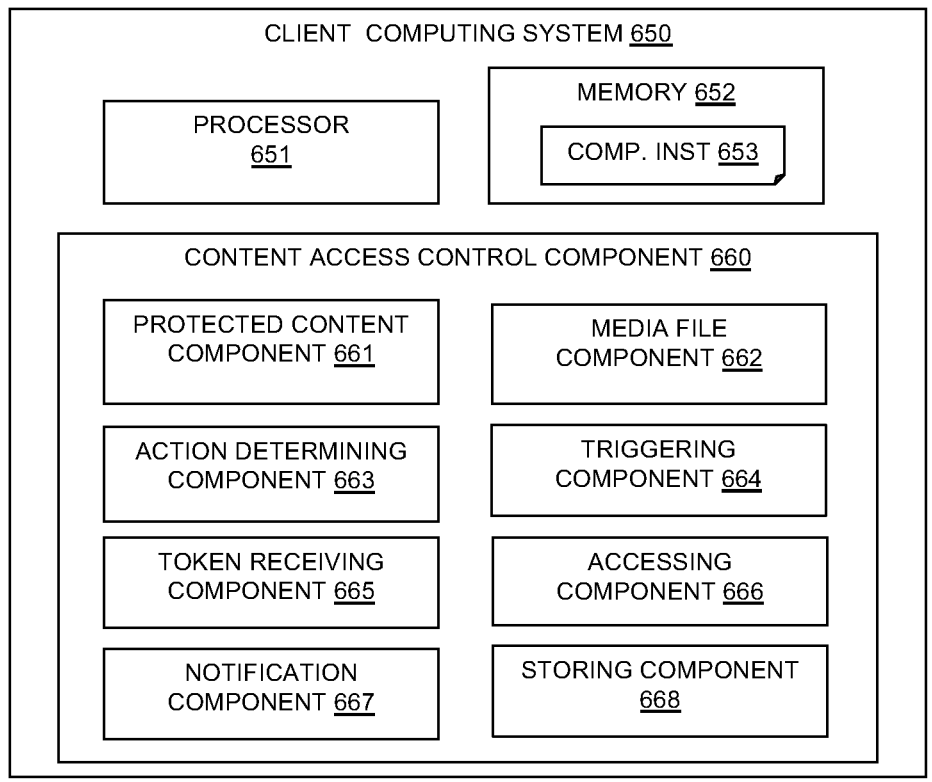
FIG. 6B is a block diagram of an example embodiment of a system in accordance with embodiments of the present invention.

Referring to FIGS. 6A and 6B, a block diagram of server system 600 and a client computer system 650 as example embodiments of the described system is shown. The server system 600 and the client computer system 650 may each include a content access control component 610, 660 that provide complementing components of the described system.

Server system 600 includes one or more server computers in combination providing the described components of the content access control component 610. In one embodiment, the server system 600 includes a content server for providing the protected content and a media server for providing the media file. The server system 600 may include at least one processor 601, a hardware module, or a circuit for executing the functions of the described components which may be software units executing on the at least one processor. Multiple processors running parallel processing threads may be provided enabling parallel processing of some or all of the functions of the components. Memory 602 may be configured to provide computer instructions 603 to the at least one processor 601 to carry out the functionality of the server components.

The content access control component 610 of the server system 600 may include a protecting component 611 for protecting content such that the content is accessible with a token and a protected content providing component 612 for providing the protected content to a client system. The protecting component 611 may encrypt the content in which case the token is a cryptographic token.

The content access control component 610 of the server system 600 may include an embedding component 613 for embedding the token in a media file and a media file providing component 614 for providing the media file to the client system. The content access control component 610 may include a linking component 615 for linking the media file to the protected content when providing the protected content to the client system. Additionally, content access control component 610 includes token releasing component 616.

The client computer system 650 may include at least one processor 651, a hardware module, or a circuit for executing the functions of the described components which may be software units executing on the at least one processor. Memory 652 may be configured to provide computer instructions 653 to the at least one processor 651 to carry out the functionality of the client components.

The content access control component 660 of the client computer system 650 may include a protected content component 661 for providing protected content on the client system such that the content is accessible with a token and a media file component 662 for providing a media file at the client system with the token embedded in the media file. The content access control component 660 of the client computer system 650 may include a token releasing component 663 for releasing the token to the client system when determining that an action condition of the media file has been met. The content access control component 660 of the client computer system 650 may include an action determining component 663 for determining that an action condition of the media file has been met and a triggering component 664 for triggering the releasing the token on completion of the action condition.

The content access control component 660 of the client computer system 650 may include a token receiving component 665 for receiving the token released to the client system when an action condition of the media file has been met and an accessing component 666 for using the token to enable access to the encrypted content on the client system. The content access control component 660 of the client computer system 650 may include a notification component 667 for providing a notification to unblock delivery or reviewing of media files in the event that the token is not released. The content access control component 660 of the client computer system 650 may include a storing component 668 for storing the released token for subsequent use at the client system.

The client system may be a client website or a client application and the encrypted content may be the whole or a portion of the content of the client website or client application.

Figure 7:
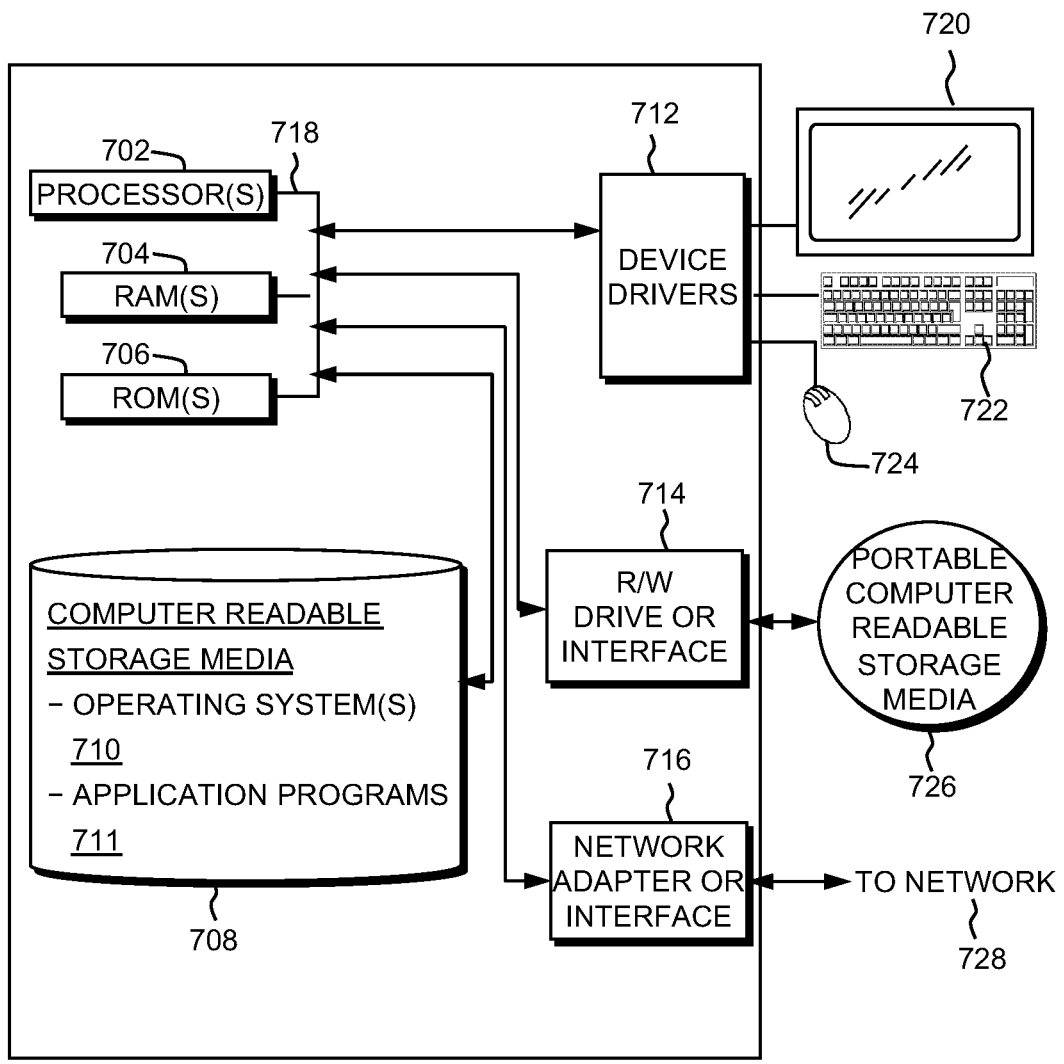
FIG. 7 is a block diagram of an embodiment of a computer system or cloud server in which embodiments of the present invention may be implemented.

FIG. 7 depicts a block diagram of components of a computing system as used for the server computing system 600 and/or the client computing system 650, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

The computing system can include one or more processors 702, one or more computer-readable RAMs 704, one or more computer-readable ROMs 706, one or more computer readable storage media 708, device drivers 712, read/write drive or interface 714, and network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710, and application programs 711, are stored on one or more of the computer readable storage media 708 for execution by one or more of the processors 702 via one or more of the respective RAMs 704 (which typically include cache memory). In the illustrated embodiment, each of the computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the present invention.

The computing system can also include a R/W drive or interface 714 to read from and write to one or more portable computer readable storage media 726. Application programs 711 on the computing system can be stored on one or more of the portable computer readable storage media 726, read via the respective R/W drive or interface 714 and loaded into the respective computer readable storage media 708.

The computing system can also include a network adapter or interface 716, such as a TCP/IP adapter card or wireless communication adapter that can communicate with network 728. Application programs 711 on the computing system can be downloaded to the computing device from an external computer or external storage device via a network (for example, the Internet, a local area network or other wide area networks or wireless networks) and network adapter or interface 716. From the network adapter or interface 716, the programs may be loaded into the computer readable storage media 708. The network may comprise copper wires, optical fibers, wireless transmission, routers, firewalls, switches, gateway computers and edge servers.

The computing system can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, RAY drive or interface 714, and network adapter or interface 716 can comprise hardware and software stored in computer readable storage media 708 and/or ROM 706.

Embodiments of the present invention may be a system, a method, and/or a computer program product at any possible technical detail level of integration. In some embodiments, the computer program product includes a computer readable storage medium (or media) having computer readable program instructions thereon for causing a processor to perform some embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
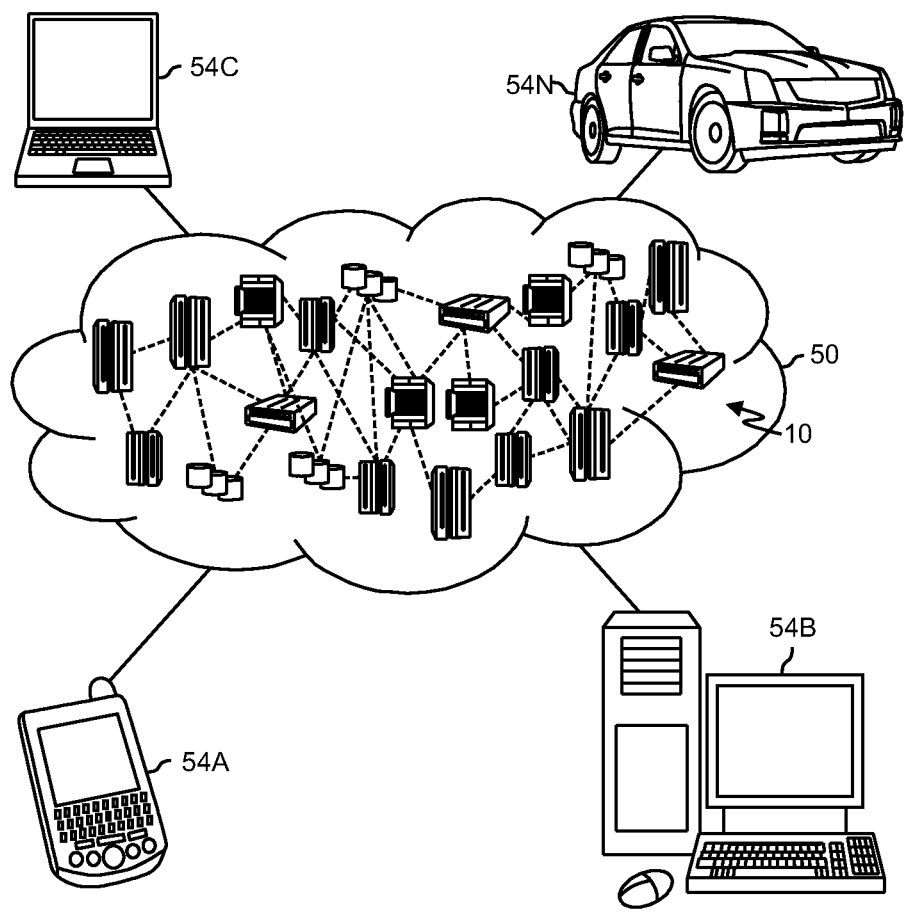
FIG. 8 is a schematic diagram of a cloud computing environment in which embodiments of the present invention may be implemented.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
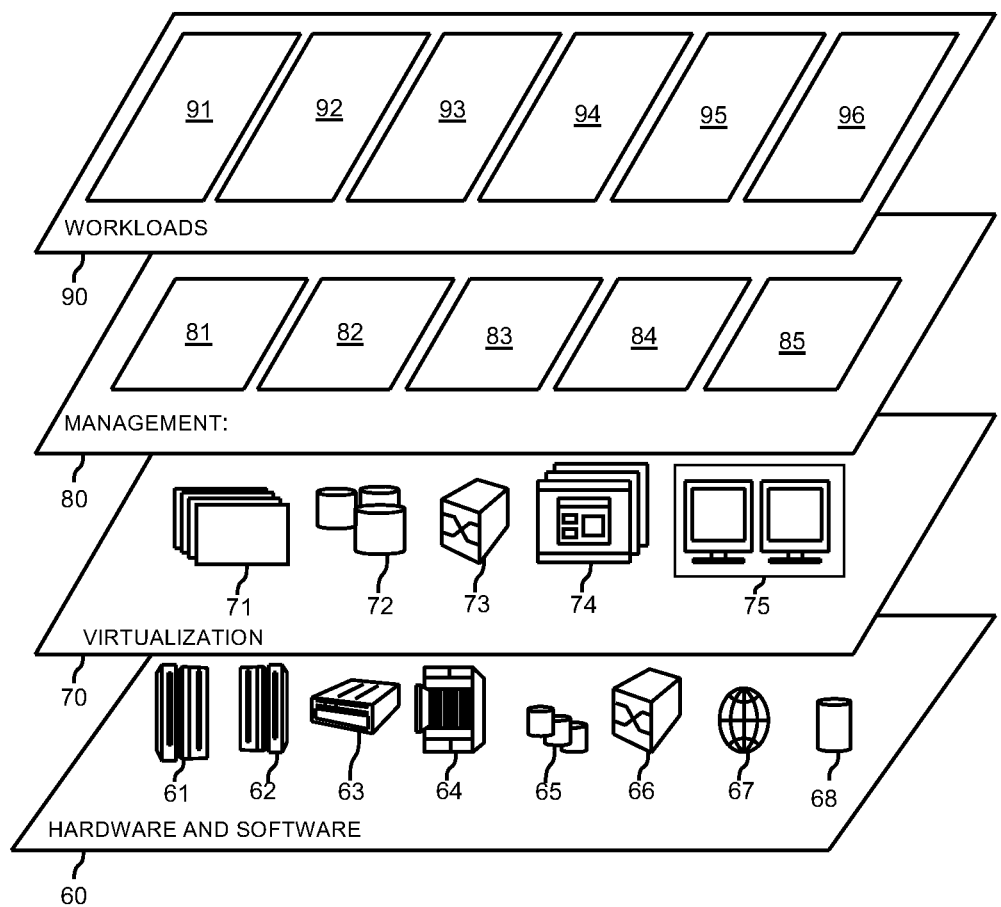
FIG. 9 is a diagram of abstraction model layers of a cloud computing environment in which embodiments of the present invention may be implemented.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content access processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

Some helpful definitions for key terms used in this document are provided below:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) for use with a client computer system including video and sound hardware for playing audiovisual presentations, the CIM comprising:
    requesting, by the client computer system a first piece of protected content;
    responsive to the request, receiving an audiovisual file corresponding to a first audiovisual presentation at the client computer system with the audiovisual file including an inactive version of a token embedded in the audiovisual file;
    determining that the audiovisual file has been played by the video and sound hardware of the client computer system so that the first audiovisual presentation has been presented to a user of the client computer system;
    responsive to the determination that the audiovisual file has been played, activating the inactive token to generate and activated version token that can be used to get access to the first piece of protected content; and
    using the token to access to the first piece of protected content on the client computer system.

2. The CIM of claim 1 wherein:
    the first piece of protected content is encrypted; and
    the activated version of the token is a cryptographic token required to access the protected content.

3. A computer program product (CPP) for use with a client computer system including video and sound hardware for playing audiovisual presentations, the CPP comprising:
    a set of storage device(s); and computer code stored collectively in the set of storage device(s), with the computer code including data and instructions to cause a processor(s) set to perform at least the following operations:

requesting, by the client computer system a first piece of protected content;

responsive to the request, receiving an audiovisual file corresponding to a first audiovisual presentation at the client computer system with the audiovisual file including an inactive version of a token embedded in the audiovisual file, determining that the audiovisual file has been played by the video and sound hardware of the client computer system so that the first audiovisual presentation has been presented to a user of the client computer system, responsive to the determination that the audiovisual file has been played, activating the inactive token to generate and activated version token that can be used to get access to the first piece of protected content, and using the token to access to the first piece of protected content on the client computer system.

4. The CPP of claim 3 wherein:

the first piece of protected content is encrypted; and the activated version of the token is a cryptographic token required to access the protected content.

5. A computer system (CS) for use with a client computer system including video and sound hardware for playing audiovisual presentations, the CS comprising:

a processor(s) set;

a set of storage device(s); and computer code stored collectively in the set of storage device(s), with the computer code including data and instructions to cause the processor(s) set to perform at least the following operations:

requesting, by the client computer system a first piece of protected content;

responsive to the request, receiving an audiovisual file corresponding to a first audiovisual presentation at the client computer system with the audiovisual file including an inactive version of a token embedded in the audiovisual file, determining that the audiovisual file has been played by the video and sound hardware of the client computer system so that the first audiovisual presentation has been presented to a user of the client computer system, responsive to the determination that the audiovisual file has been played, activating the inactive token to generate and activated version token that can be used to get access to the first piece of protected content, and using the token to access to the first piece of protected content on the client computer system.

6. The CS of claim 5 wherein:

the first piece of protected content is encrypted; and the activated version of the token is a cryptographic token required to access the protected content.

\* \* \* \* \*